(12) United States Patent
Schaem

(10) Patent No.: US 8,405,780 B1
(45) Date of Patent: Mar. 26, 2013

(54) GENERATING A CLEAN REFERENCE IMAGE

(75) Inventor: Stephan Schaem, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1616 days.

(21) Appl. No.: 11/895,162

(22) Filed: Aug. 22, 2007

(51) Int. Cl.
*H04N 9/64* (2006.01)
*H04N 9/74* (2006.01)

(52) U.S. Cl. ........................................ 348/586; 348/576

(58) Field of Classification Search .................. 348/576, 348/586; 382/180
See application file for complete search history.

(56) References Cited

U.S. PATENT DOCUMENTS

| | | | |
|---|---|---|---|
| 5,400,081 A | | 3/1995 | Chaplin |
| 6,100,925 A | * | 8/2000 | Rosser et al. ................ 348/169 |
| 6,288,703 B1 | | 9/2001 | Berman et al. |
| 6,704,665 B2 | * | 3/2004 | Ueno ............................. 702/41 |
| 6,707,940 B1 | | 3/2004 | Qian |
| 6,950,130 B1 | | 9/2005 | Qian |
| 7,015,978 B2 | * | 3/2006 | Jeffers et al. .................. 348/586 |
| 7,079,151 B1 | | 7/2006 | Rublee |
| 7,085,413 B2 | | 8/2006 | Huang et al. |
| 7,907,778 B2 | * | 3/2011 | Xiao et al. ..................... 382/180 |
| 2001/0036231 A1 | * | 11/2001 | Easwar et al. ........... 375/240.19 |
| 2002/0027617 A1 | | 3/2002 | Jeffers et al. |
| 2006/0239548 A1 | | 10/2006 | Gallafent et al. |
| 2008/0317379 A1 | * | 12/2008 | Steinberg et al. ............. 382/275 |

FOREIGN PATENT DOCUMENTS

| | | |
|---|---|---|
| GB | 2408887 | 6/2005 |
| WO | WO 2006/010276 | 2/2006 |

OTHER PUBLICATIONS

Adobe—Flash Article, Creating a Talking-Head Flash Video [online], [retrieved on Jun. 1, 2007], 9 pages. Retrieved from Internet, URL: http://www.adobe.com/devnet/flash/articles/talking_head_video_03.html.
Ultimatte AdvantEdge User Guide, 2002-2006 Ultimate Corporation [online], [retrieved on Jun. 1, 2007], 75 pages. Retrieved from Internet, URL: http://www.ultimatte.com/UltimatteMain/Software_files/AdvantEdgeManual.pdf.
International Preliminary Report on Patentability for PCT Application No. PCT/US2008/073755, dated Feb. 24, 2010, 8 pages.
International Search Report and Written Opinion for PCT Application No. PCT/US2008/073755, dated Dec. 5, 2008.

\* cited by examiner

*Primary Examiner* — Kieu Oanh T Bui
(74) *Attorney, Agent, or Firm* — Fish & Richardson P.C.

(57) ABSTRACT

The present disclosure includes, among other things, systems, methods and program products for generating a clean reference frame image. A method includes obtaining a color census of a color image. A color profile is selected based on the color census. One or more foreground areas of the image are identified, the foreground areas comprising image areas containing colors that do not fit the color profile. For each identified foreground area, a color is applied to the identified foreground area based on one or more colors of one or more non-identified image areas to create a clean reference image.

30 Claims, 9 Drawing Sheets
(4 of 9 Drawing Sheet(s) Filed in Color)

GENERATING A CLEAN REFERENCE IMAGE

BACKGROUND

Chroma keying typically involves the removal of a color or colors from a digital image (which for brevity will simply be referred to as an image) so that the areas of removed color can be replaced with another image. Chroma keying is commonly used in television broadcasts; for example, weather reporters often stand in front of a blue or green screen, and chroma keying is used to replace the screen with a weather map. Chroma keying is also referred to as "color keying" or "color-separation overlay" (CSO). Chroma keying typically involves photographing or filming foreground objects (e.g., a person) in front of a backdrop having a single color or, if the lighting is uneven or the backdrop is a poor quality backdrop, a relatively narrow range of colors. The backdrop is commonly blue or green because those colors tend not to be found in skin tones.

A clean reference image (or reference frame or key) that depicts the background of an image (usually a blue or green screen used during filming) is important to chroma keying. During background replacement, different chroma keying techniques compare an image with a reference image to distinguish foreground areas from background areas. If the reference image does not accurately depict the background, chroma keying can incorrectly replace areas of the image that are not background or fail to replace areas of the image that are background.

This problem has typically been solved by capturing one image of a scene with all of the foreground objects removed. That image serves as a clean reference frame, and includes subtle details of the background that result from uneven lighting or defects in the material of the background. However, sometimes capturing such an image may not be practical—for example, if the scene includes heavy foreground objects such as furniture that are difficult to remove. Sometimes, filming may be completed and it is no longer possible to capture an image of the background.

SUMMARY

In general, one or more aspects of the subject matter described in this specification can be embodied in one or more methods that include obtaining a color census of a color image. A color profile is selected based on the color census. One or more foreground areas of the image are identified, the foreground areas comprising image areas containing colors that do not fit the color profile. For each identified foreground area, a color is applied to the identified foreground area based on one or more colors of one or more non-identified image areas to create a clean reference image. Other embodiments of this aspect include corresponding systems, apparatus, and computer program products.

These and other embodiments can optionally include one or more of the following features. Performing a color census can include omitting image areas from the color census that have a saturation value, a luminance value, or a brightness value below a first threshold or above a second threshold. Selecting a color profile based on the color census can comprise selecting a dominant color profile, the dominant color profile including the most frequent color in the image or a set of the most frequent colors in the image. One or more areas of the image are identified as noise or foreground detail. A color can be applied to the areas of the image identified as noise or foreground detail based on the one or more non-identified image areas.

One or more areas of the image can be identified as noise or foreground detail by detecting edges in the image and identifying image areas within a distance of the edges as noise. Identifying one or more areas of the image as noise or foreground detail can comprise identifying image areas that have a characteristic that differs in value by a specified amount from the average value of that characteristic of surrounding image areas. The characteristic can be luminance or brightness. Applying a color to the identified foreground area based on one or more non-identified image areas can comprise selecting an image window comprising an image area containing the identified foreground area based on one or more non-identified areas of the image; determining the average color of the window; and assigning the average color to the identified foreground area. Obtaining the color census of the color image can comprise sampling over the color image to create an image sample; and deriving the color census based on the image sample. The image can be obtained from a video.

Particular embodiments of the subject matter described in this specification can be implemented to realize one or more of the following advantages. A clean reference image can be automatically generated without requiring a user to identify background colors of an image. The clean reference image can be generated after images have been captured even if there is no clean shot of the background. The clean reference image contains details about the background, including variations in the color of the background that result from uneven lighting, defects in a backdrop, or other imperfections. The clean reference image can be used during chroma keying to improve the accuracy of background replacement. Techniques described herein can be applied on each frame of a video. If, for example, the lighting condition changes (e.g., an outdoor shoot) or a camera position changes, a clean reference frame for the current frame can be automatically generated.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

FIGS. 1A-F illustrate generation of a clean reference image, where each figure depicts the image at a stage of generation. An image can be represented as a raster of pixels (e.g., a two dimensional array of pixels), where each pixel encodes values (e.g., color, intensity, or both) that describe the image at a particular location. Typically an image and its constituent pixels are described by an image format such as the Joint Photographic Expert Group (JPEG) format, Portable Network Graphics (PNG) format, Graphic Interchange Format (GIF) format, Bitmap (BMP) format, Tagged Image File Format (TIFF) format, and others. An image does not necessarily correspond to a file. An image may be stored in a portion of a file that holds other content or information, in a single file dedicated to the image in question, or in multiple coordinated files. Moreover, an image can be stored in a memory without having first been stored in a file or files. In various implementations, an image is obtained from a sequence of images such as a video. The techniques described in this disclosure can be applied to a single image or to multiple images (e.g., in a video).

Color information is typically specified in terms of a color space. Various implementations support a variety of color spaces including, but not limited to, Red, Green and Blue (RGB); Cyan, Magenta, Yellow and Black (CMYK); Yellow Chromate Conversion (YCC); Hue, Saturation, and Brightness (HSB); Hue, Saturation, and Luminance (HSL); Hue, Saturation, and Value (HSV); or Grayscale. A color space determines how values can be interpreted as a color. For example, in an RGB encoded image, a color is encoded by at least three values corresponding to each of RGB's three color components: red, green and blue. In an HSV encoded image, a color is encoded by at least three values: the hue, which is the color type, such as red, blue, or yellow; the saturation, which is the intensity of the color, often represented from 0-100% where 0 means no color and 100 means intense color; and the value, which is the brightness of the color.

Figure 1A:
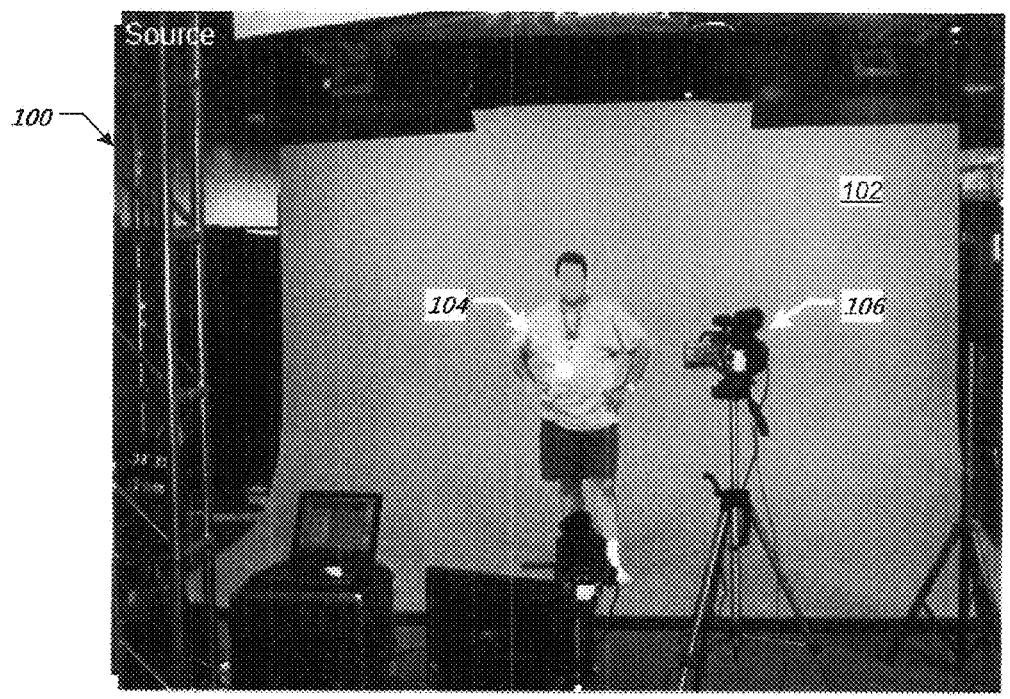
FIGS. 1A-G illustrate generation of a clean reference image.

FIG. 1A shows an example input image 100 of a person 104 and various other foreground objects (e.g. camera 106) in front of a green background 102. The green background 102 has variations in color due to lighting; some areas appear dark green and some areas appear light green. During generation of a clean reference image for image 100, a color profile is selected that is used to identify background areas of the image. The color profile is selected based on data collected during a color census of colors in the image. Taking a color census includes collecting statistical information about colors present in the image. In some implementations, the color profile selected is the dominant color profile, which is the color or set of colors that are found most often in the image. For example, the dominant color profile of the input image 100 in FIG. 1A would include the shades of green found in the green background 102. The color census and the color profile are described in more detail below.

Figure 1B:
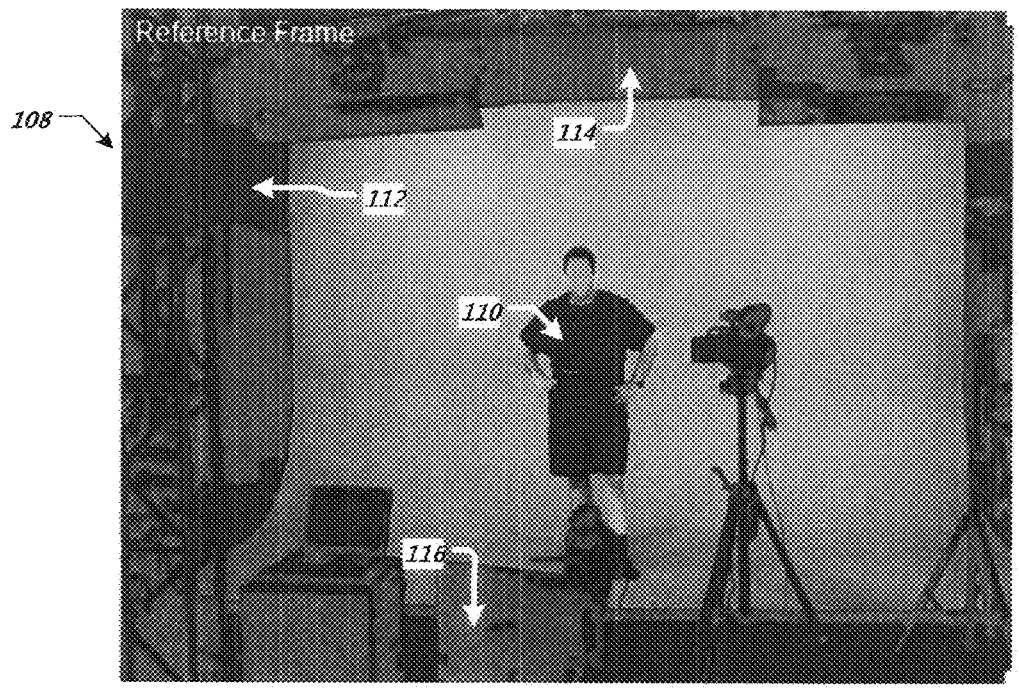

In some implementations, some areas of the image are ignored, e.g. not included, in the color census. Image areas can be ignored for different reasons: image areas that have a saturation value below a threshold value are ignored because it is known that most green and blue screens do not have colors with saturation values below that threshold. Alternatively, areas that have a brightness or luminance value above a threshold can be ignored based on similar knowledge of green and blue screens. (If the image's color space does not support luminance or brightness, the image can be converted into a color space that does.) For example, FIG. 1B shows areas of the input image 108 that are ignored because they have saturation values below a threshold (e.g., blue areas 110 and 112) and areas that are ignored because they have brightness or luminance values above a threshold (e.g., red areas 114 and 116).

Figure 1C:
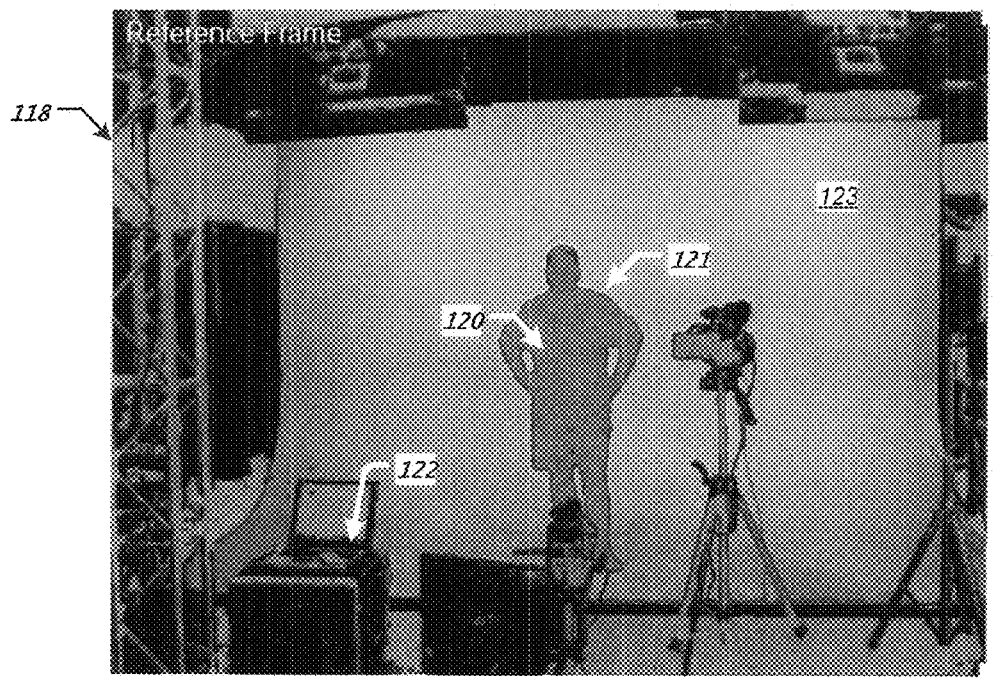

During generation of a clean reference image, image areas are identified that do not fit the selected color profile. For example, FIG. 1C shows areas of the input image 118, colored in purple (e.g., 120 and 122), that do not fit the dominant color profile. The areas 120 and 122 do not fit the dominant color profile because they do not contain any of the variations of green in the background 123. Identifying areas that do not fit the color profile is described in more detail below.

In some implementations, after identifying areas of the image that do not fit the selected color profile, other areas are identified that are not suitable for use in a clean reference image or are not representative of the background. For example, in some implementations, areas containing noise and unwanted foreground details are identified.

Figure 1D:
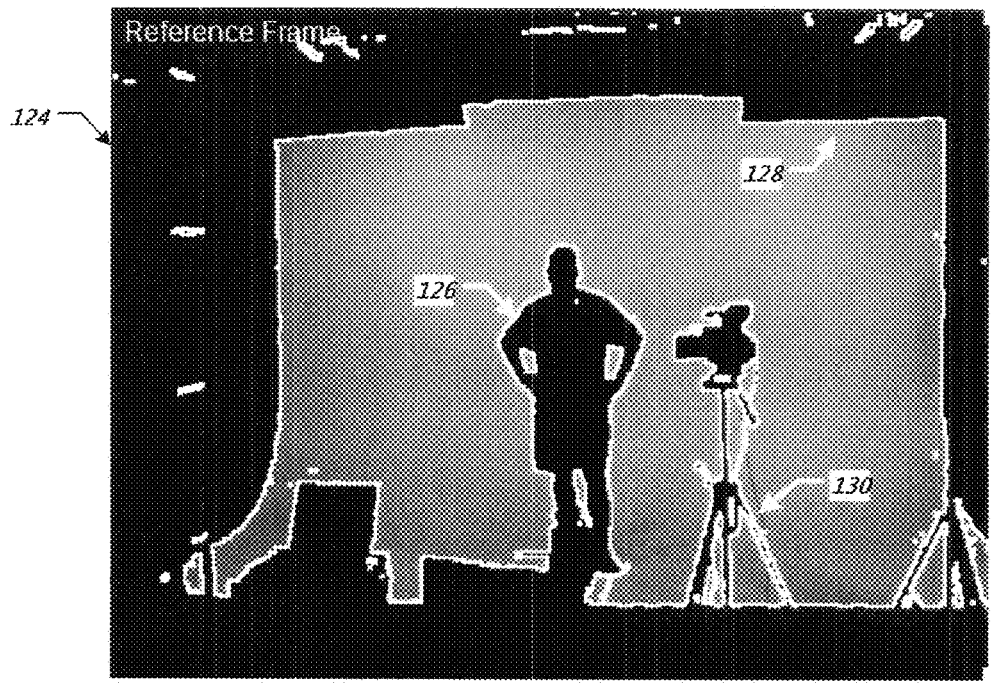

In some implementations, image noise is identified using edge detection techniques or other suitable techniques. FIG. 1D shows the input image 124 after edge detection and identification of areas around edges that are likely to contain noise. The identified areas are shown in the image as white bands (e.g., 126 and 128). These areas are likely to contain noise known as "ringing" which is an artifact of video compression. Sometimes, edge detection cannot be used to identify all noise in an image (e.g., 130). Edge detection is described in more detail below.

Figure 1E:
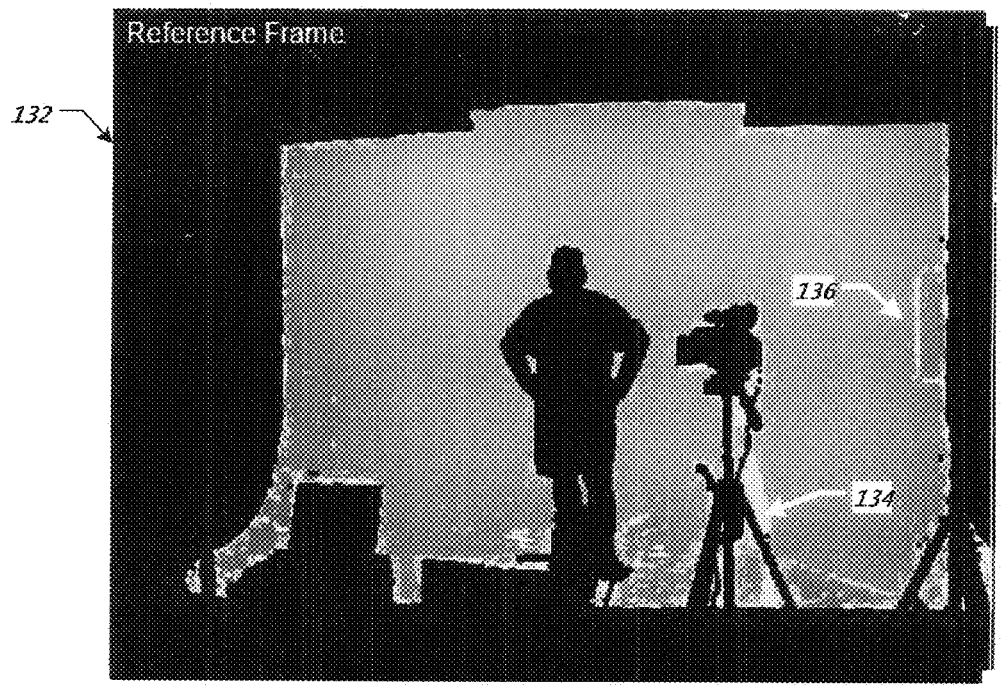
Figure 1F:
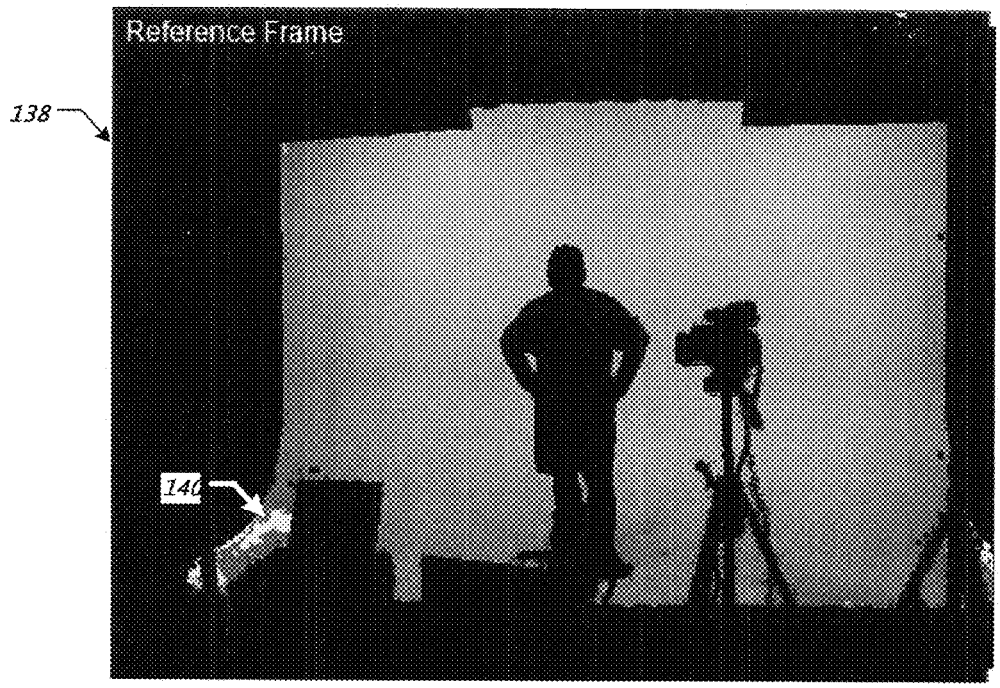

In further implementations, noise and unwanted foreground details are identified using luminance filtering techniques. The luminance filtering techniques are similar to blur filters, such as the Gaussian blur that is widely used in image processing to reduce image noise and reduce detail levels. For example, FIG. 1E shows the input image 132 after additional areas containing noise (e.g., 134 and 136) have been identified in yellow using a luminance filter technique, and FIG. 1F shows the input image 138 after a second luminance filter technique further identifies areas containing noise in yellow (e.g., 140). The luminance filter techniques are discussed in more detail below.

Figure 1G:
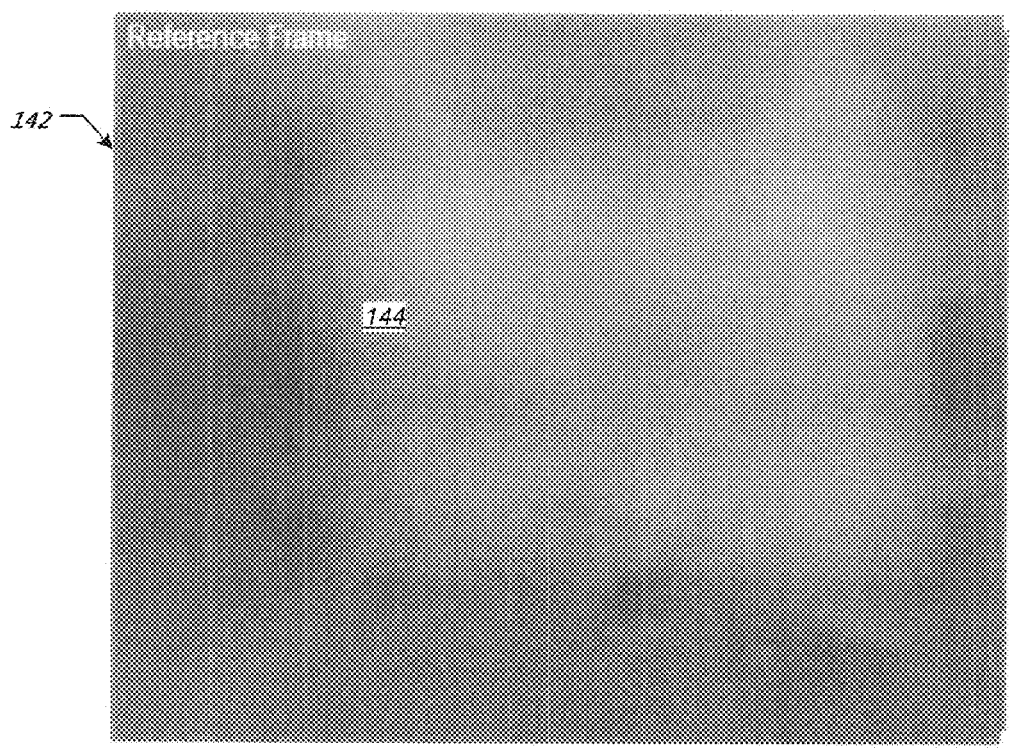

FIG. 1G shows the final clean reference image 142 generated by one implementation. This image was generated by estimating or interpolating color values for identified image areas from non-identified image areas. For example, the image areas containing the person 104 in FIG. 1A were identified, and the image areas that the person 104 occupied were filled in by estimating or interpolating colors from the nearby shades of green in the background 102, which consisted mostly of image areas that were not identified. The clean reference image retains the variations in shades of green (e.g., 144) shown in the background of the input image, and it does not contain any image areas that were not part of the background or contained noise that distorted the background.

Figure 2:
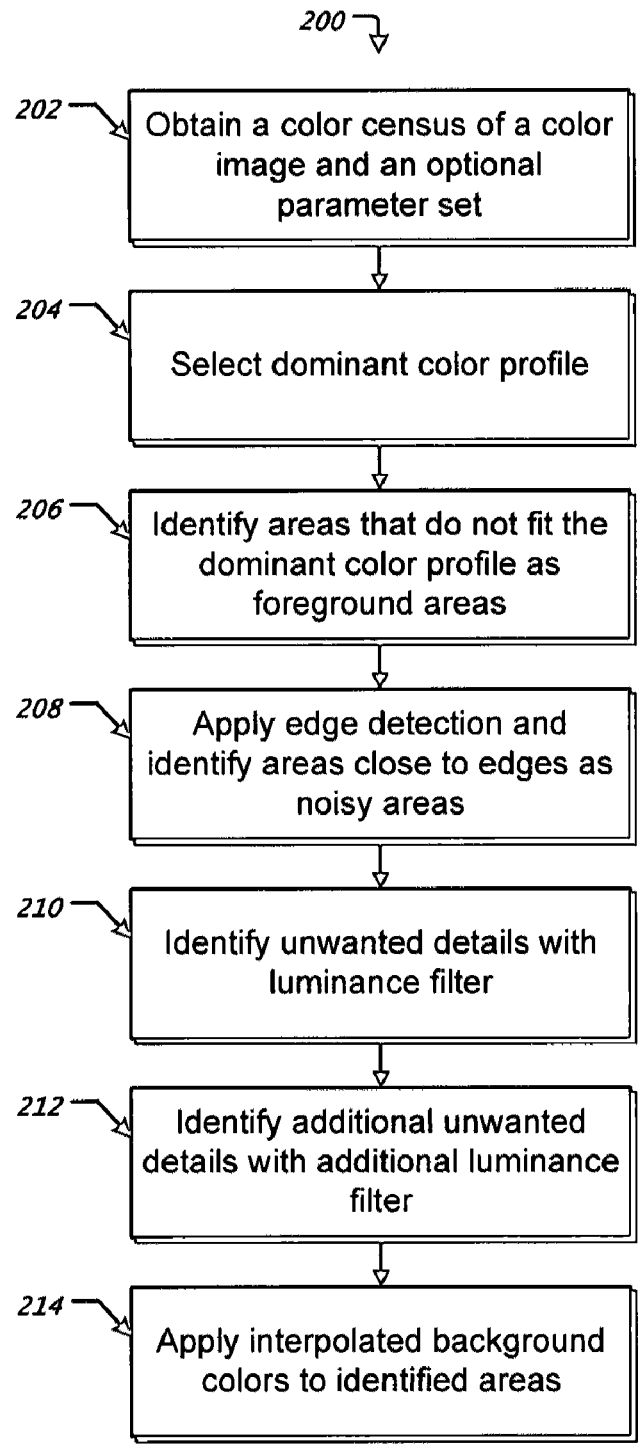
FIG. 2 is a flow diagram of an example method for generating a clean reference image.

FIG. 2 is a flow diagram of an example method 200 for generating a clean reference image. The method 200 operates on a color image that typically contains a discernable background. In general, the background can be any color or can include a number of colors. For example, the background can be a blue or green backdrop that is intended to be replaced by chroma keying, and, the backdrop can have variations due to uneven lighting or defects in the backdrop. Alternatively, the background can be a pattern.

In some implementations, a set of parameters that are used to specify exactly how certain operations are to be performed are obtained (step 202). For example, in one implementation, three parameter sets are created, called "soft," "normal," and "detailed." The parameters contained in each set are tailored to deal with images considered "soft" or "normal" or "detailed." The parameters are: a luminance level, where no image area below the luminance level will be included in the color census; a saturation level, where no image area below the saturation level will be included in the color census; a hue deviation amount, where the color profile is specified by a single reference color and all colors that deviate by the hue deviation amount; a saturation deviation amount, where the color profile is specified by a single reference color and all colors that deviate by the saturation deviation amount; an acceptable luminance noise level; an acceptable luminance deviation, for use in removing noise and unwanted foreground details; and a number of pixels, where identifying noise includes identifying pixels that are within a distance specified by the number of pixels from detected edges.

A color census of the image is taken (step 202). Taking the color census includes collecting statistical information about colors in the image. In some implementations the whole image is examined; alternatively, the whole image or parts of the image can be sampled. In some implementations, a histogram or similar table or list containing information on how frequently colors appear in the image is created. The census can have different granularities, e.g., it can have a counter for every single point in a color space or it can have a counter for 3D regions in color space (clustering). Taking the color census can be performed in any color space, and the image can be converted to a different color space to take the color census. In some implementations, areas that have a saturation value below a threshold value are ignored, and areas that have a brightness or luminance value above a threshold value are ignored, as mentioned above. The threshold values can be specified by the parameter set obtained in step 202. Other areas can be ignored, for example, based on information indicating that some areas are not suitable for a clean reference image or cannot possibly be part of the background.

A color profile is a color, a set of colors, a collection of one or more points in a color space, or combinations of these. A color profile is selected based on the color census (step 204). In some implementations, the color profile selected is the dominant color profile, which includes the most frequent color or colors in the image. Alternatively, the color profile can be selected based on other information known about the image; for example, if it is known that the background is a green or blue screen, the most frequent color or colors of green or blue can be selected. In some implementations, the color profile is a color or a list or table of a set of colors. Alternatively, the color profile can be based on a certain acceptable deviation from a single color; for example, the color profile can be one color plus colors that deviate from that color by a specified hue or saturation value. The amount of deviation can be specified by the parameter set. Alternatively, the color profile can be specified by a function. The color profile can be specified in any color space.

Areas that do not fit the color profile are identified (step 206; e.g., 120 and 122 in FIG. 1C). Areas can be identified in different ways, e.g., by setting the color of those areas to black (or any color) or creating a list or table to store identified areas. In some implementations, areas that do not fit the color profile are areas that do not contain any colors in the color profile. These areas are often foreground areas of the image. Alternatively, areas that do not fit the color profile can be areas that have some other relationship to the color or colors in the color profile. For example, areas that do not fit the color profile can be areas that have hue values (or other characteristics) that differ by more than a threshold value from the hue values of the colors in the color profile. The threshold value can be specified by the parameter set. In some implementations, noise and other unwanted foreground details are identified. Different techniques can be used to identify noise and unwanted foreground details.

Noise can identified by applying edge detection to the image and identifying areas within a certain distance of edges in the image, for example (step 208). The distance can be specified by the parameter set. These areas likely contain color noise known as "ringing" due to video compression (e.g., 121 in FIG. 1C). Edge detection identifies the areas of a digital image where an image characteristic (e.g., brightness or luminance) changes sharply. Different techniques can accomplish edge detection. For example, the Canny edge detection operator can be used; other edge detection methods include the Roberts Cross operator, the Prewitt operator, the Sobel operator, and the Marr-Hildreth algorithm. In the case where image areas are identified as noise by setting the color of all of those areas to a certain color, identification of noise can be accomplished using an edge erosion filter. An edge erosion filter operates, for example, by detecting edges (using any edge detection method, including those discussed above) and setting all image areas within a certain distance of the edges to a certain color.

In various implementations, noise and unwanted foreground details (e.g., 134 and 136 in FIGS. 1E and 140 in FIG. 1F) are identified using luminance filtering techniques (steps 210 and 212). Values in the parameter set can specify thresholds and other specific details used in these steps. One implementation of these steps is described in more detail below and shown in FIG. 3.

Color is applied to the identified areas based on the non-identified areas (step 214). In some implementations, the non-identified areas are background areas suitable for use in a clean reference image, and the applied colors are determined by interpolation from the non-identified areas. Values in the parameter set can specify thresholds and other specific details used in this step. One implementation of this step is described in more detail below and shown in FIG. 4. In general, many implementations are suitable for deriving color values for the identified areas from the non-identified areas.

Figure 3:
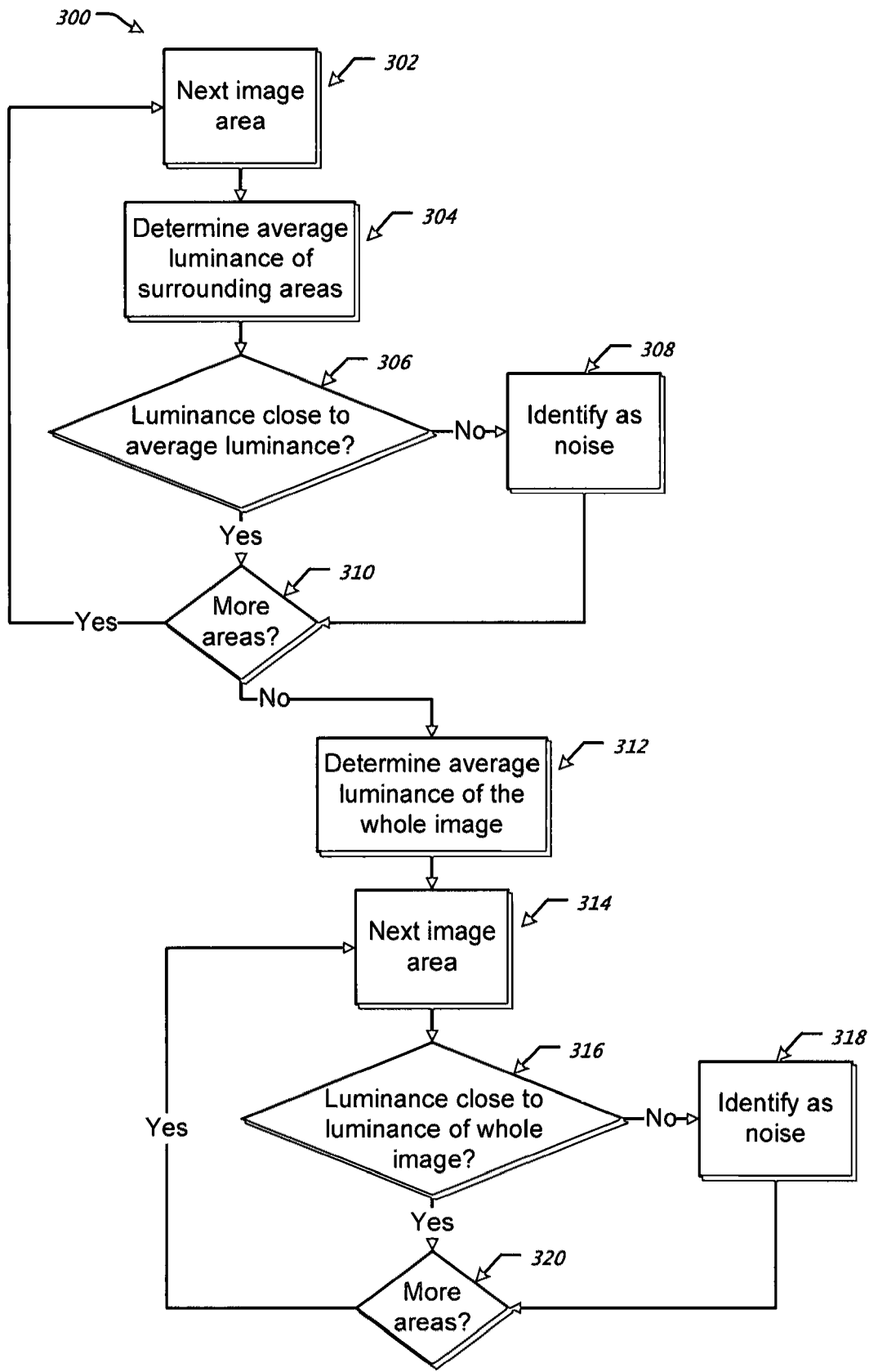
FIG. 3 is a flow diagram of an example two stage luminance filtering technique.

FIG. 3 is a flow diagram of an example method 300 for using luminance filtering techniques to identify noise and unwanted foreground details (e.g., 134 and 136 in FIGS. 1E and 140 in FIG. 1F). The method 300 is shown using luminance values, but other image characteristics can be used, for example, brightness or saturation. The method 300 selects an area of the image, e.g. a pixel or group of pixels (step 302). The average luminance of some areas surrounding the selected area (e.g., the average luminance of all of the surrounding pixels) is determined (step 304), and if that average luminance is not close to the luminance of the selected area (step 306), the selected area is identified as noise (step 308). The number and size of surrounding areas to use can be specified by the parameter set obtained in step 202 of FIG. 2 or derived from other parameters in the parameter set (e.g., an acceptable luminance noise level or an acceptable luminance deviation). The luminance of the selected area is close to the average luminance if the difference between the two values is less than a threshold. The threshold can be specified by the parameter set. The method 300 repeats for any further image areas (step 310; return to step 302).

When no image areas remain, the method 300 determines the average luminance of the whole image (step 312). The method 300 selects an image area (step 314) and compares the luminance of that area to the average luminance of the whole image (step 316); if the luminance is not close, the area is identified as noise (step 318). The luminance of the selected area is close to the average luminance if the difference between the two values is less than a threshold. The threshold can be specified by the parameter set. The method 300 repeats for any further image areas (step 320; return to step 312).

Figure 4:
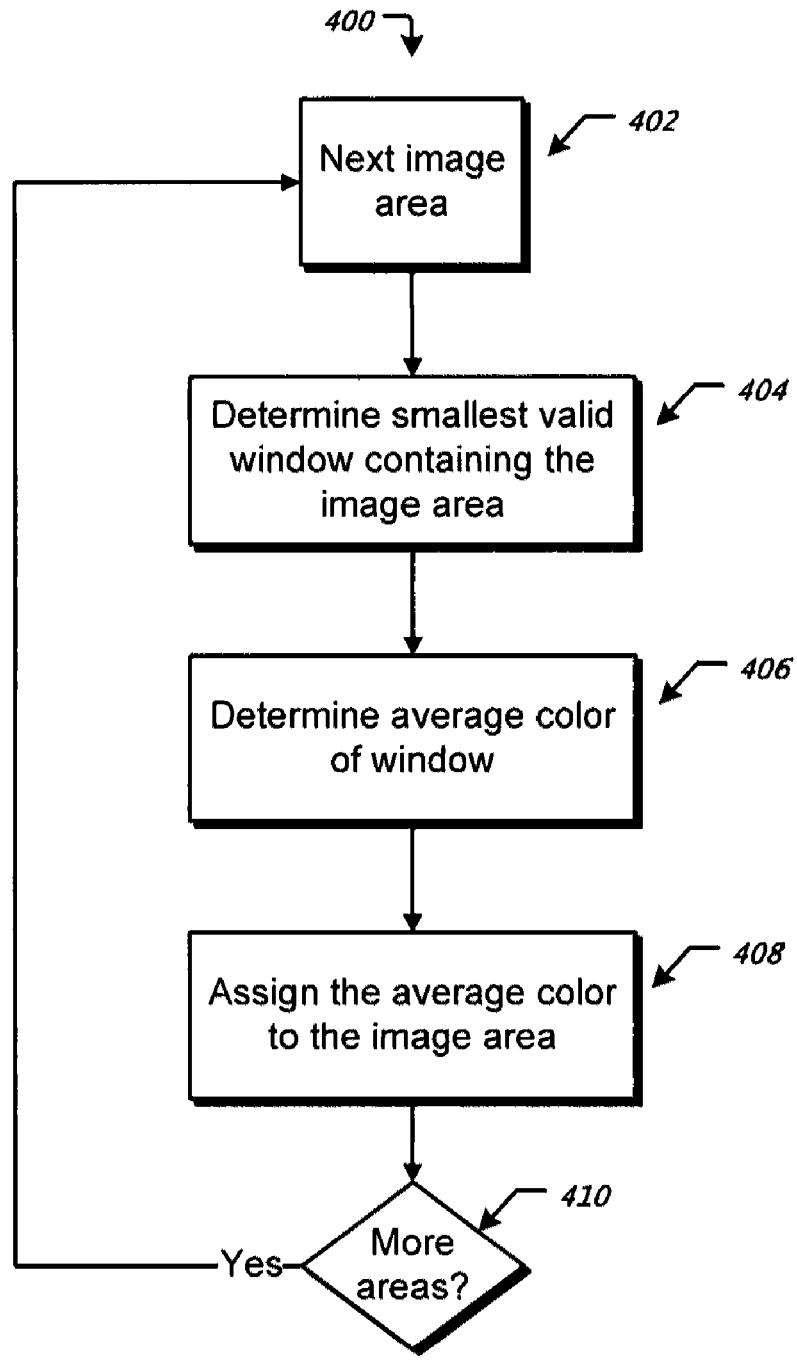
FIG. 4 is a flow diagram of an example method for interpolating background colors and applying the background colors to non-background areas of an image.

FIG. 4 is a flow diagram of an example method 400 for interpolating background colors and applying the interpolated background colors to non-background areas of an image. The method 400 selects an image area (step 402) and determines the smallest valid window (image area) containing the selected image area (step 404). A window is considered valid if it contains at least a threshold percentage of non-identified image areas (e.g., the window is valid if 50% or more of the window is not identified). The threshold percentage can be specified by the parameter set. Determining the smallest valid window can be accomplished in different ways. For example, a binary search method can be used, starting with a large starting window (e.g. the entire image) and shrinking and enlarging the window until the smallest valid window is found. If no valid window can be found, the threshold percentage can be lowered or the method can stop and issue an error message. The method 400 determines the average color of the window (step 406) and assigns that average color to the selected image area (step 408). If further image areas remain (step 410), the method 400 interpolates colors for those areas (return to step 402).

Figure 5:
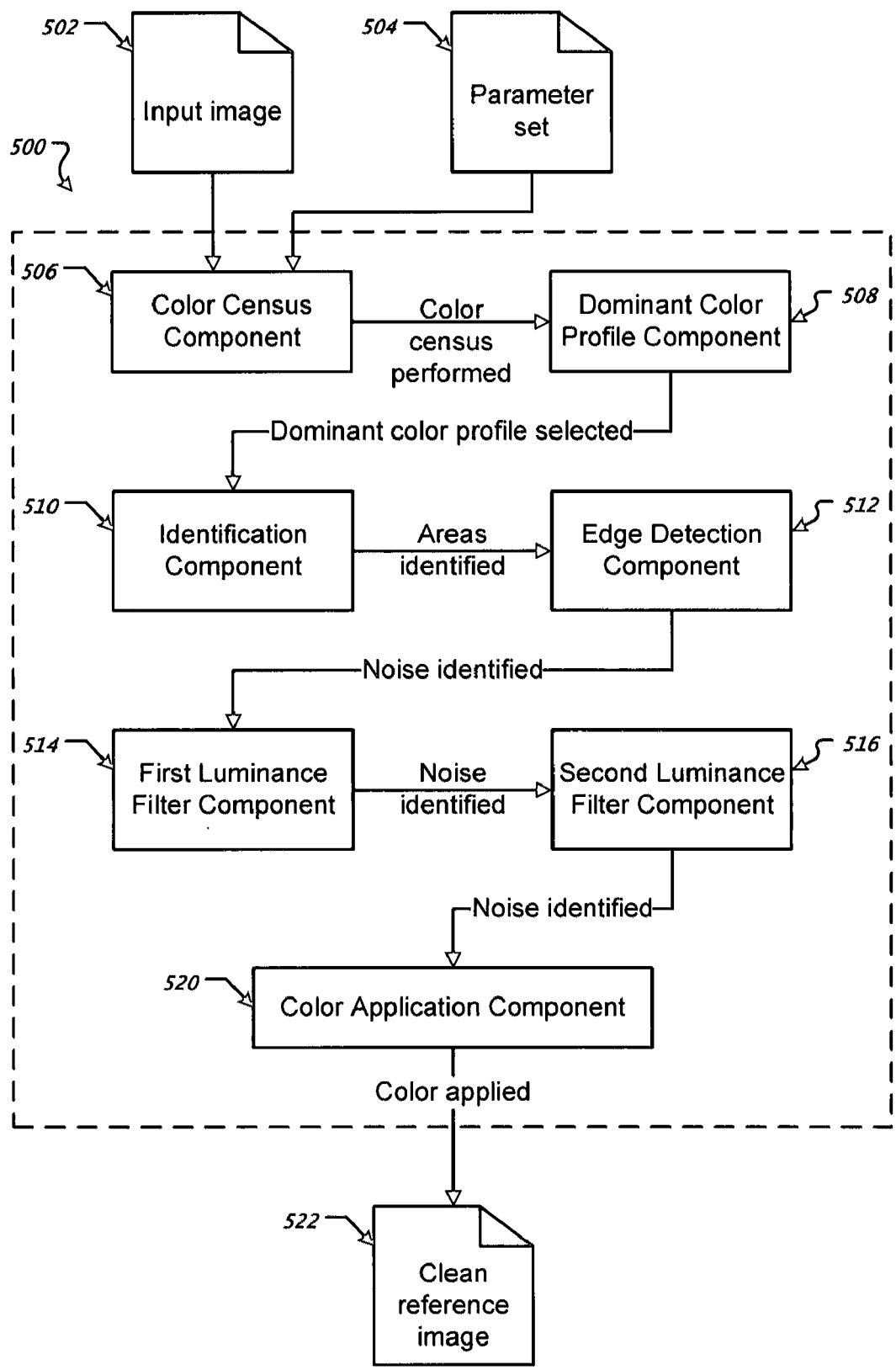
FIG. 5 illustrates an example system for generating a clean reference image.

FIG. 5 illustrates a system 500 for generating a clean reference image. Although several components are illustrated, there may be fewer or more components in the system 500. Moreover, the components can be distributed on one or more computing devices connected by one or more networks or other suitable communication means.

The system 500 takes as input an image 502 and an optional parameter set 504. The color census component 506 performs a color census of the image 502. The dominant color profile component 508 selects the dominant color profile. The identification component 510 identifies image areas that do not fit the dominant color profile. The edge detection component 512 uses edge detection to identify image noise. The first and second luminance filter components 514 and 516 further identify image noise and unwanted foreground details. The color application component 520 applies color to identified areas based on non-identified areas. The system 500 produces a clean reference image as output 522.

Figure 6:
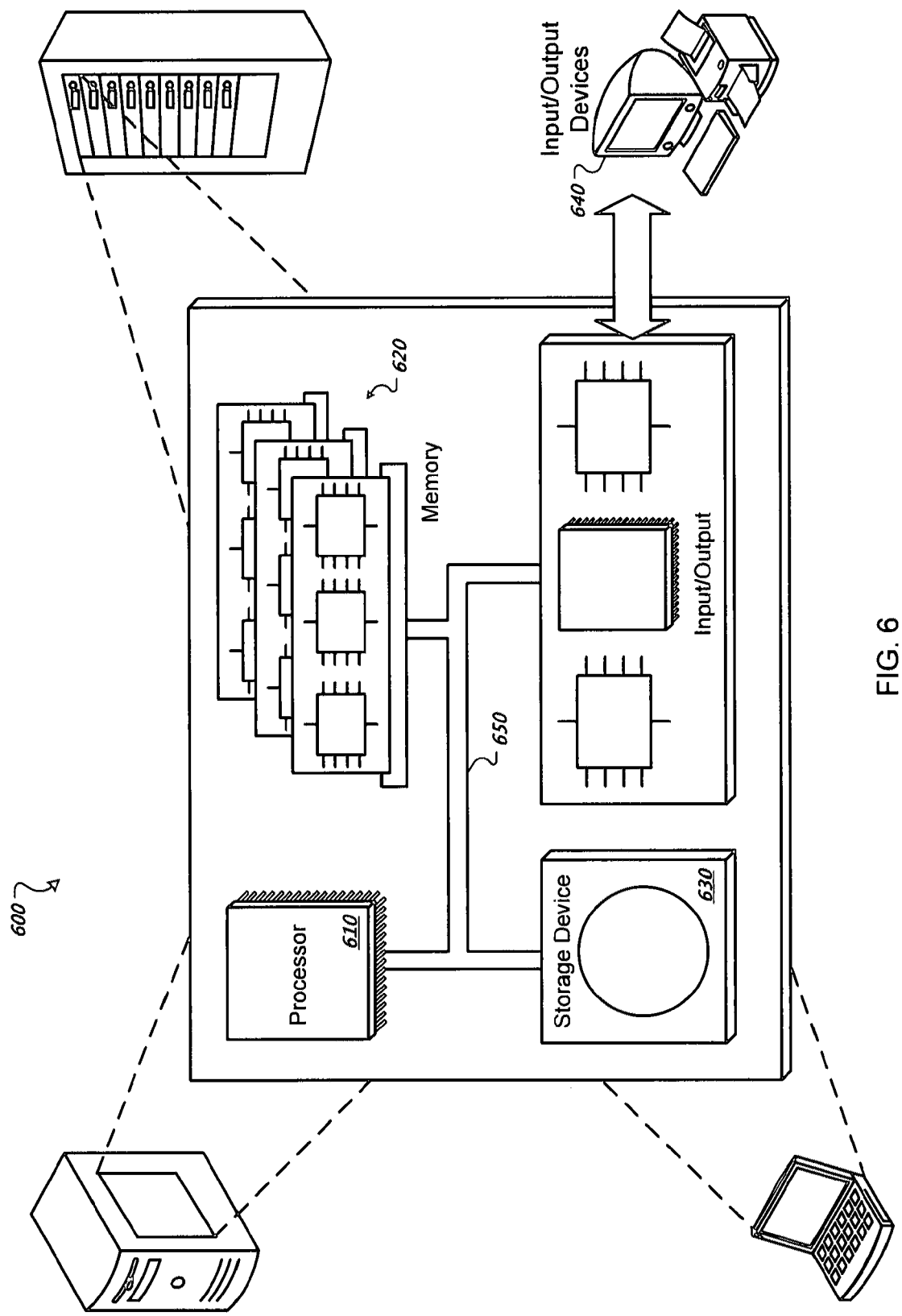
FIG. 6 is a schematic diagram of a generic computer system.

FIG. 6 is a schematic diagram of a generic computer system 600. The system 600 can be used for practicing operations described in association with the methods 200, 300 and 400, for example. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of system 500, for example. In one implementation, the processor 610 is a single or multi-threaded processor with one or more processor cores. The processor 610 is capable of processing instructions stored in the memory 620 or on the storage device 630 to display graphical information for a user interface on the input/output device 640.

The memory 620 is a computer readable medium such as volatile or non volatile random access memory that stores information within the system 600. The memory 620 could store color images, color censuses and parameter sets, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method comprising:
   obtaining a color census of a color image;
   selecting a color profile based on the color census;
   identifying one or more foreground areas of the image, the foreground areas comprising image areas containing colors that do not fit the color profile; and
   creating a clean reference image, wherein for each identified foreground area, a color is applied to the identified foreground area based on one or more colors of one or more non-identified image areas.

2. The method of claim 1 where performing a color census comprises:
   omitting image areas from the color census that have a saturation value, a luminance value, or a brightness value below a first threshold or above a second threshold.

3. The method of claim 1 where selecting a color profile based on the color census comprises:
   selecting a dominant color profile, the dominant color profile including the most frequent color in the image or a set of the most frequent colors in the image.

4. The method of claim 1 further comprising:
   identifying one or more areas of the image as noise or foreground detail; and
   applying a color to the areas of the image identified as noise or foreground detail based on the one or more non-identified image areas.

5. The method of claim 4 where identifying one or more areas of the image as noise or foreground detail comprises:
   detecting edges in the image and identifying image areas within a distance of the edges as noise.

6. The method of claim 4 where identifying one or more areas of the image as noise or foreground detail comprises:
   identifying image areas that have a characteristic that differs in value by a specified amount from the average value of that characteristic of surrounding image areas.

7. The method of claim 6 where the characteristic is luminance or brightness.

8. The method claim 1 where applying a color to the identified foreground area based on one or more non-identified image areas comprises:

selecting an image window comprising an image area containing the identified foreground area based on one or more non-identified areas of the image;
determining the average color of the window; and
assigning the average color to the identified foreground area.

9. The method of claim 1 where obtaining the color census of the color image comprises:
sampling over the color image to create an image sample; and
deriving the color census based on the image sample.

10. The method of claim 1 where the color image is obtained from a video.

11. A computer program product, encoded on a computer-readable medium, operable to cause data processing apparatus to perform operations comprising:
obtaining a color census of a color image;
selecting a color profile based on the color census;
identifying one or more foreground areas of the image, the foreground areas comprising image areas containing colors that do not fit the color profile; and
creating a clean reference image, wherein for each identified foreground area, a color is applied to the identified foreground area based on one or more colors of one or more non-identified image areas.

12. The program product of claim 11 where performing a color census comprises:
omitting image areas from the color census that have a saturation value, a luminance value, or a brightness value below a first threshold or above a second threshold.

13. The program product of claim 11 where selecting a color profile based on the color census comprises:
selecting a dominant color profile, the dominant color profile including the most frequent color in the image or a set of the most frequent colors in the image.

14. The program product of claim 11 further operable to cause the data processing apparatus to perform operations comprising:
identifying one or more areas of the image as noise or foreground detail; and
applying a color to the areas of the image identified as noise or foreground detail based on the one or more non-identified image areas.

15. The program product of claim 14 where identifying one or more areas of the image as noise or foreground detail comprises:
identifying image areas that have a characteristic that differs in value by a specified amount from the average value of that characteristic of surrounding image areas.

16. The program product of claim 15 where the characteristic is luminance or brightness.

17. The program product of claim 14 where identifying one or more areas of the image as noise or foreground detail comprises:
detecting edges in the image and identifying image areas within a distance of the edges as noise.

18. The program product claim 11 where applying a color to the identified foreground area based on one or more non-identified image areas comprises:
selecting an image window comprising an image area containing the identified foreground area based on one or more non-identified areas of the image;
determining the average color of the window; and
assigning the average color to the identified foreground area.

19. The program product of claim 11 where obtaining the color census of the color image comprises:
sampling over the color image to create an image sample; and
deriving the color census based on the image sample.

20. The program product of claim 11 where the color image is obtained from a video.

21. A system comprising:
a user interface device; and
one or more computers operable to interact with the user interface device and to perform operations comprising:
obtaining a color census of a color image;
selecting a color profile based on the color census;
identifying one or more foreground areas of the image, the foreground areas comprising image areas containing colors that do not fit the color profile; and
creating a clean reference image, wherein for each identified foreground area, a color is applied to the identified foreground area based on one or more colors of one or more non-identified image areas.

22. The system of claim 21 where performing a color census comprises:
omitting image areas from the color census that have a saturation value, a luminance value, or a brightness value below a first threshold or above a second threshold.

23. The system of claim 21 where selecting a color profile based on the color census comprises:
selecting a dominant color profile, the dominant color profile including the most frequent color in the image or a set of the most frequent colors in the image.

24. The system of claim 21 where the one or more computers are further operable to perform operations comprising:
identifying one or more areas of the image as noise or foreground detail; and
applying a color to the areas of the image identified as noise or foreground detail based on the one or more non-identified image areas.

25. The system of claim 24 where identifying one or more areas of the image as noise or foreground detail comprises:
detecting edges in the image and identifying image areas within a distance of the edges as noise.

26. The system of claim 24 where identifying one or more areas of the image as noise or foreground detail comprises:
identifying image areas that have a characteristic that differs in value by a specified amount from the average value of that characteristic of surrounding image areas.

27. The system of claim 26 where the characteristic is luminance or brightness.

28. The system claim 21 where applying a color to the identified foreground area based on one or more non-identified image areas comprises:
selecting an image window comprising an image area containing the identified foreground area based on one or more non-identified areas of the image;
determining the average color of the window; and
assigning the average color to the identified foreground area.

29. The system of claim 21 where obtaining the color census of the color image comprises:
sampling over the color image to create an image sample; and
deriving the color census based on the image sample.

30. The system of claim 21 where the color image is obtained from a video.

* * * * *